US012783285B2

(12) United States Patent
Suzuki et al.

(10) Patent No.: US 12,783,285 B2
(45) Date of Patent: Nov. 3, 2026

(54) DATA COOPERATION USING AN ACCELERATOR

(71) Applicant: NTT, Inc., Tokyo (JP)

(72) Inventors: Takahiro Suzuki, Musashino (JP); Sang-Yuep Kim, Musashino (JP)

(73) Assignee: NTT, Inc., Tokyo (JP)

( * ) Notice: Subject to any disclaimer, the term of this patent is extended or adjusted under 35 U.S.C. 154(b) by 372 days.

(21) Appl. No.: 18/684,420

(22) PCT Filed: Sep. 21, 2021

(86) PCT No.: PCT/JP2021/034455
§ 371 (c)(1),
(2) Date: Feb. 16, 2024

(87) PCT Pub. No.: WO2023/047436
PCT Pub. Date: Mar. 30, 2023

(65) Prior Publication Data
US 2024/0354146 A1 Oct. 24, 2024

(51) Int. Cl.
*G06F 9/455* (2018.01)
*G06F 9/50* (2006.01)

(52) U.S. Cl.
CPC ........ *G06F 9/45558* (2013.01); *G06F 9/5027* (2013.01); *G06F 2009/45583* (2013.01)

(58) Field of Classification Search
CPC ............... G06F 9/45558; G06F 9/5027; G06F 2009/45583; G06F 9/5077; G06F 12/109
See application file for complete search history.

(56) References Cited

U.S. PATENT DOCUMENTS

| | | | | |
|---|---|---|---|---|
| 2017/0054720 | A1* | 2/2017 | Geng | H04L 67/568 |
| 2021/0075633 | A1* | 3/2021 | Sen | G06F 13/4022 |
| 2022/0029914 | A1* | 1/2022 | Hyoudou | H04L 45/42 |
| 2022/0188385 | A1* | 6/2022 | Ganesan | G06F 21/105 |

OTHER PUBLICATIONS

S. Gerangelos and N. Koziris, "vPHI: Enabling Xeon Phi Capabilities in Virtual Machines," 2017 IEEE International Parallel and Distributed Processing Symposium Workshops (IPDPSW), Lake Buena Vista, FL, USA, 2017, pp. 1333-1340 (Year: 2017).*

(Continued)

*Primary Examiner* — Dione N. Simpson
(74) *Attorney, Agent, or Firm* — Fish & Richardson P.C.

(57) ABSTRACT

One aspect of the present invention is an information processing device including a function achieved by software executed in a virtual environment to which virtual hardware resources including an accelerator are allocated and an orchestrator, in which: the orchestrator allocates a transfer source memory area and a transfer destination memory area for cooperation target data between the functions; and the function includes a control unit that rewrites an address of the transfer source memory area or transfer destination memory area which is referred to when a function of an own virtual environment performs data cooperation with a function of another virtual environment to an address of the transfer source memory area or transfer destination memory area allocated by the orchestrator.

8 Claims, 8 Drawing Sheets

(56) References Cited

OTHER PUBLICATIONS

Suzuki et al., "Demonstration of Fully Softwarized 10G-EPON PHY Processing on a General-Purpose Server for Flexible Access Systems," IEEE/OSA Journal of Lightwave Technology, Feb. 2020, 38(4):777-783.

Watts et al., "Insight from a Docker Container Introspection," Proceedings of the 52nd Hawaii International Conference on System Sciences, Grand Wailea, HI, USA, Jan. 8-11, 2019, 7194-7203, 10 pages.

* cited by examiner

DATA COOPERATION USING AN ACCELERATOR

CROSS-REFERENCE TO RELATED APPLICATIONS

This application is a National Stage application under 35 U.S.C. § 371 of International Application No. PCT/JP2021/034455, having an International Filing Date of Sep. 21, 2021. The disclosure of the prior application is considered part of the disclosure of this application, and is incorporated by reference in its entirety into this application.

TECHNICAL FIELD

The present invention relates to a technique for achieving a function by using an accelerator.

BACKGROUND ART

Conventional methods of implementing an application in a system using an accelerator such as a graphic processing unit (GPU) or a field programmable gate array (FPGA) are, for example, a method of implementing a series of functions for achieving a purpose in a piece of software and a method of implementing the functions in respective virtual environments such as different containers or virtual machines (VMs) and achieving data cooperation between the functions by data transfer between the virtual environments (see, for example, Non Patent Literatures 1 and 2).

CITATION LIST

Non Patent Literature

Non Patent Literature 1: Takahiro Suzuki, Sang-Yuep Kim, Jun-ichi Kani, Jun Terada, "Demonstration of Fully Softwarized 10G-EPON PHY Processing on A General-Purpose Server for Flexible Access Systems", IEEE/OSA Journal of Lightwave Technology, vol. 38, Issue 4, pp. 777-783, February 2020.

Non Patent Literature 2: Watts, Thomas & Benton, Ryan & Glisson, William & Shropshire, Jordan. (2019). Insight from a Docker Container Introspection. 10.24251/HICSS.2019.863.

SUMMARY OF INVENTION

Technical Problem

However, the conventional methods may not perform data transfer between the functions at a high speed due to overhead of data transfer between the virtual environments. Further, the conventional methods may not dynamically switch data cooperation between the functions and thus may not quickly respond to a function change request to the system. As described above, the conventional methods may not efficiently perform data cooperation between the functions.

In view of the above circumstances, an object of the present invention is to provide a technique capable of more efficiently performing data cooperation between functions in a system that achieves the functions by using an accelerator.

Solution to Problem

One aspect of the present invention is an information processing device including a function achieved by software executed in a virtual environment to which virtual hardware resources including an accelerator are allocated and an orchestrator, in which: the orchestrator allocates a transfer source memory area and a transfer destination memory area for cooperation target data between the functions; and the function includes a control unit that rewrites an address of the transfer source memory area or transfer destination memory area which is referred to when a function of an own virtual environment performs data cooperation with a function of another virtual environment to an address of the transfer source memory area or transfer destination memory area allocated by the orchestrator.

One aspect of the present invention is an information processing method in which an information processing device including a function achieved by software executed in a virtual environment to which virtual hardware resources including an accelerator are allocated and an orchestrator causes the orchestrator to allocate a transfer source memory area and a transfer destination memory area for cooperation target data between the functions, and causes a control unit of the function to rewrite an address of the transfer source memory area or transfer destination memory area which is referred to when a function of an own virtual environment performs data cooperation with a function of another virtual environment to an address of the transfer source memory area or transfer destination memory area allocated by the orchestrator.

Advantageous Effects of Invention

The present invention can more efficiently perform data cooperation between functions in a system that achieves the functions by using an accelerator.

DESCRIPTION OF EMBODIMENTS

Figure 1:
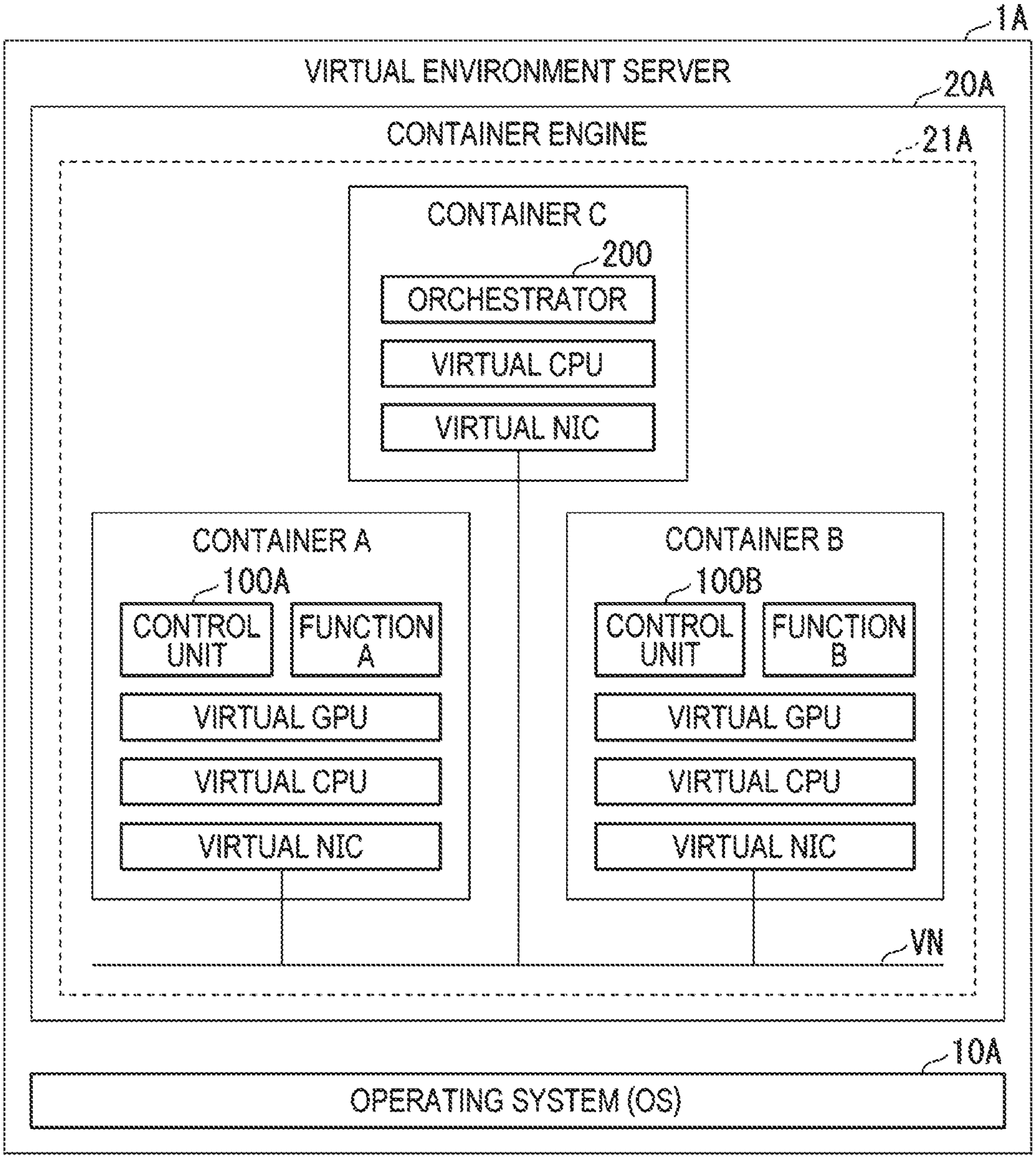
FIG. 1 illustrates a first configuration example of a virtual environment server according to an embodiment.
Figure 2:
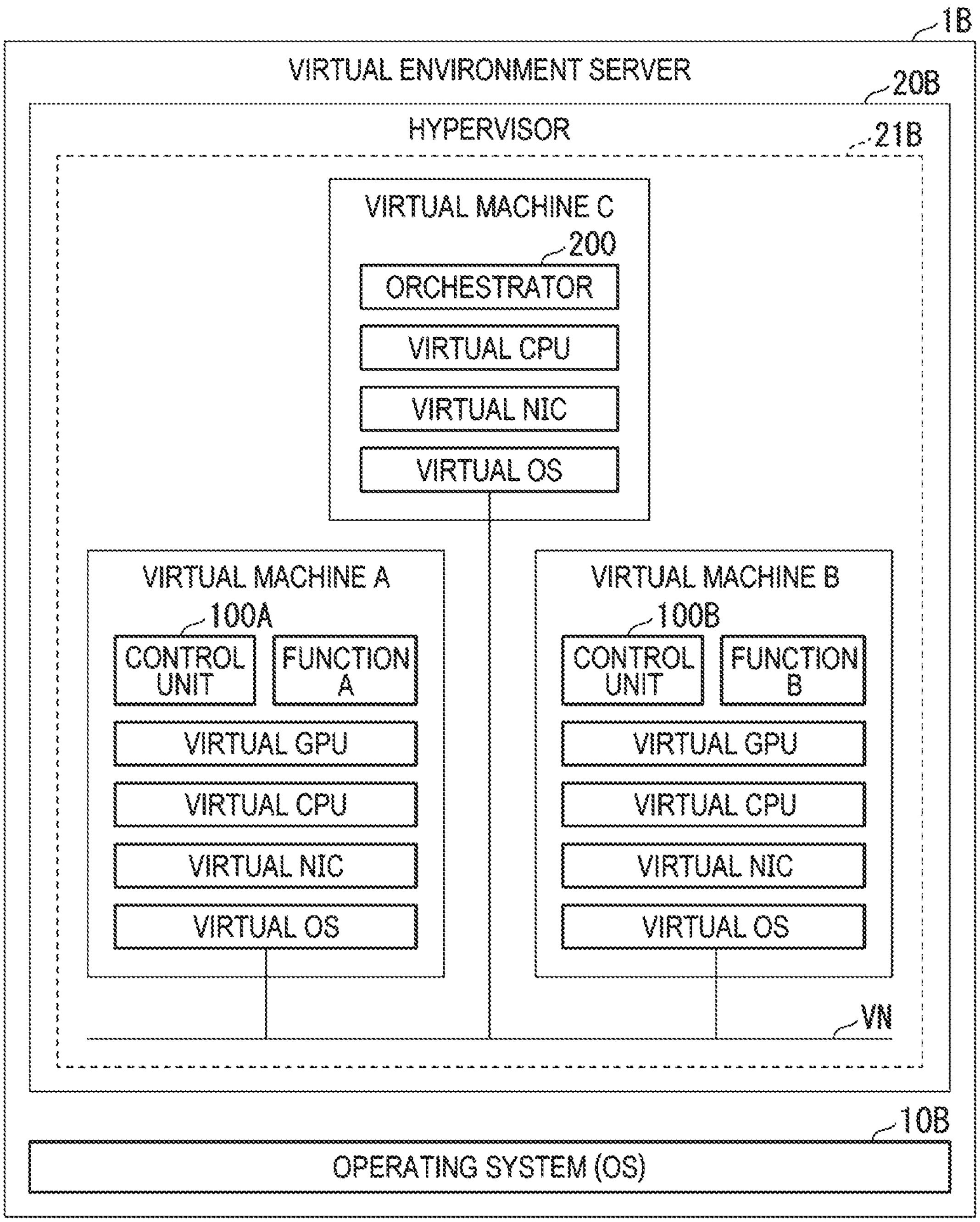
FIG. 2 illustrates a second configuration example of a virtual environment server according to an embodiment.

Embodiments of the present invention will be described below in detail with reference to the drawings. FIGS. 1 and 2 illustrate configuration examples of a virtual environment server 1 of the present invention. FIG. 1 illustrates a configuration example where a virtual environment is configured by a container engine, and FIG. 2 illustrates a configuration example where a virtual environment is configured by a hypervisor. The hypervisor is middleware that configures one or more independent virtual machines (VMs) on hardware resources of a physical server. Meanwhile, the container engine is middleware that configures one or more independent containers (operating environments of application programs) on the hardware resources of the physical server.

The virtual machine and the container have the following points in common: the virtual machine and the container have virtual hardware resources (e.g. virtual processor, memory, and network interface) and generate an operating environment of an application program by using those virtual hardware resources. However, the virtual machine and the container are different in a method of achieving the operating environment. Specifically, the virtual machine configures an operating environment of an application on an operating system, whereas the container configures the operating environment of the application without using the operating system.

(Configuration of Virtual Environment Server Including Container Engine)

First, a configuration example of a virtual environment server 1A including a container engine will be described with reference to FIG. 1. The virtual environment server 1A includes a central processing unit (CPU), a graphic processing unit (GPU), a memory, an auxiliary storage device, and the like connected via a bus and executes programs. The virtual environment server 1A generates an operating system 10A by executing a program. The virtual environment server 1A also generates a container engine 20A by executing a program on the operating system 10A. The GPU is an example of an accelerator. The accelerator may be not only the GPU, but also a floating-point unit (FPU), a digital signal processor (DSP), a field programmable gate array (FPGA), or the like.

The operating system 10A provides an application execution environment by using hardware resources of the virtual environment server 1A. The operating system 10A generates the container engine 20A by executing a program and provides the container engine 20A with an interface function for using the hardware resources.

The container engine 20A generates a virtualized environment 21A including one or more containers as the application execution environment. In the present embodiment, the container engine 20A generates a container of each function necessary for achieving an arbitrary purpose and a container for an orchestrator that achieves data cooperation between functions. In the container of each function, a control unit that controls data cooperation between functions is generated. FIG. 1 illustrates a case where the container engine 20A generates a container A, a container B, and a container C. The container A is a container for executing a function A and includes a control unit 100A that controls data cooperation between the function A and another function. The container B is a container for executing a function B and includes a control unit 100B that controls data cooperation between the function B and another function. The container C is a container for executing an orchestrator 200.

The container engine 20A can allocate a virtual GPU, a virtual CPU, and a virtual network interface (virtual NIC) to the containers by using hardware resources available via the operating system 10A. In FIG. 1, processing of each function is assumed to be executed by the virtual GPU, and thus the virtual GPU is allocated to the containers A and B. In FIG. 1, processing of the orchestrator is assumed to be executed by the virtual CPU, and thus only the virtual CPU is allocated to the container C, without applying the virtual GPU. The container engine 20A configures a virtual network VN in the virtualized environment 21A and connects the virtual NIC of each container to the network VN. Therefore, the containers can communicate with each other via the network VN.

The virtual GPU may be allocated to the container C in a case where the processing of the orchestrator is executed by the virtual GPU, or the virtual GPU may not be allocated to the containers A and B in a case where the processing of each function is executed by the virtual CPU. The number of containers of each function generated by the container engine 20A may be one or three or more.

(Configuration of Virtual Environment Server Including Hypervisor)

Next, a configuration example of the virtual environment server 1B including a hypervisor will be described with reference to FIG. 2. A hardware configuration of the virtual environment server 1B is similar to that of the virtual environment server 1A. The virtual environment server 1B generates an operating system 10B by executing a program. The virtual environment server 1B generates a hypervisor 20B by executing a program on the operating system 10B.

The operating system 10B is similar to the operating system 10A. The operating system 10B generates the hypervisor 20B by executing a program and provides the hypervisor 20B with an interface function for using hardware resources.

The hypervisor 20B generates a virtualized environment 21B including one or more virtual machines as the application execution environment. In the present embodiment, the hypervisor 20B generates a virtual machine of each function necessary for achieving an arbitrary purpose and a virtual machine for an orchestrator that achieves data cooperation between functions. FIG. 2 illustrates a case where the hypervisor 20B generates a virtual machine A, a virtual machine B, and a virtual machine C. The virtual machine A is a virtual machine for executing the function A and includes the control unit 100A that controls data cooperation between the function A and another function. The virtual machine B is a virtual machine for executing the function B and includes the control unit 100B that controls data cooperation between the function B and another function. The virtual machine C is a virtual machine for executing the orchestrator 200. The control unit 100A, the control unit 100B, and the orchestrator 200 are similar to those in FIG. 1.

The hypervisor 20B can allocate a virtual GPU, a virtual CPU, and a virtual NIC to the virtual machines by using hardware resources available via the operating system 10B, and a virtual operating system (virtual OS) is installed in each virtual machine. In FIG. 2, as in the case of FIG. 1, the virtual GPU is allocated to the virtual machines A and B, and only the virtual CPU is allocated to the virtual machine C, without applying the virtual GPU. Further, as in the case of FIG. 1, the hypervisor 20B configures the virtual network VN and connects the virtual NIC of each virtual machine to the network VN. Therefore, the virtual machines can communicate with each other via the network VN.

As in the case of FIG. 1, the virtual GPU may be allocated to the virtual machine C in a case where the processing of the orchestrator is executed by the virtual GPU, or the virtual GPU may not be allocated to the virtual machines A and B in a case where the processing of each function is executed by the virtual CPU. Further, as in the case of FIG. 1, the number of virtual machines of each function generated by the hypervisor 20B may be one or three or more.

Hereinabove, the configuration of the virtual environment server 1A including the container engine and the configuration of the virtual environment server 1B including the hypervisor have been described, and a data cooperation method between the functions in the present invention is applicable to both the virtual environment servers 1A and 1B. Hereinafter, a method of achieving data cooperation between the functions will be described by assuming the virtual environment server 1A including the container engine in FIG. 1.

Figure 3:
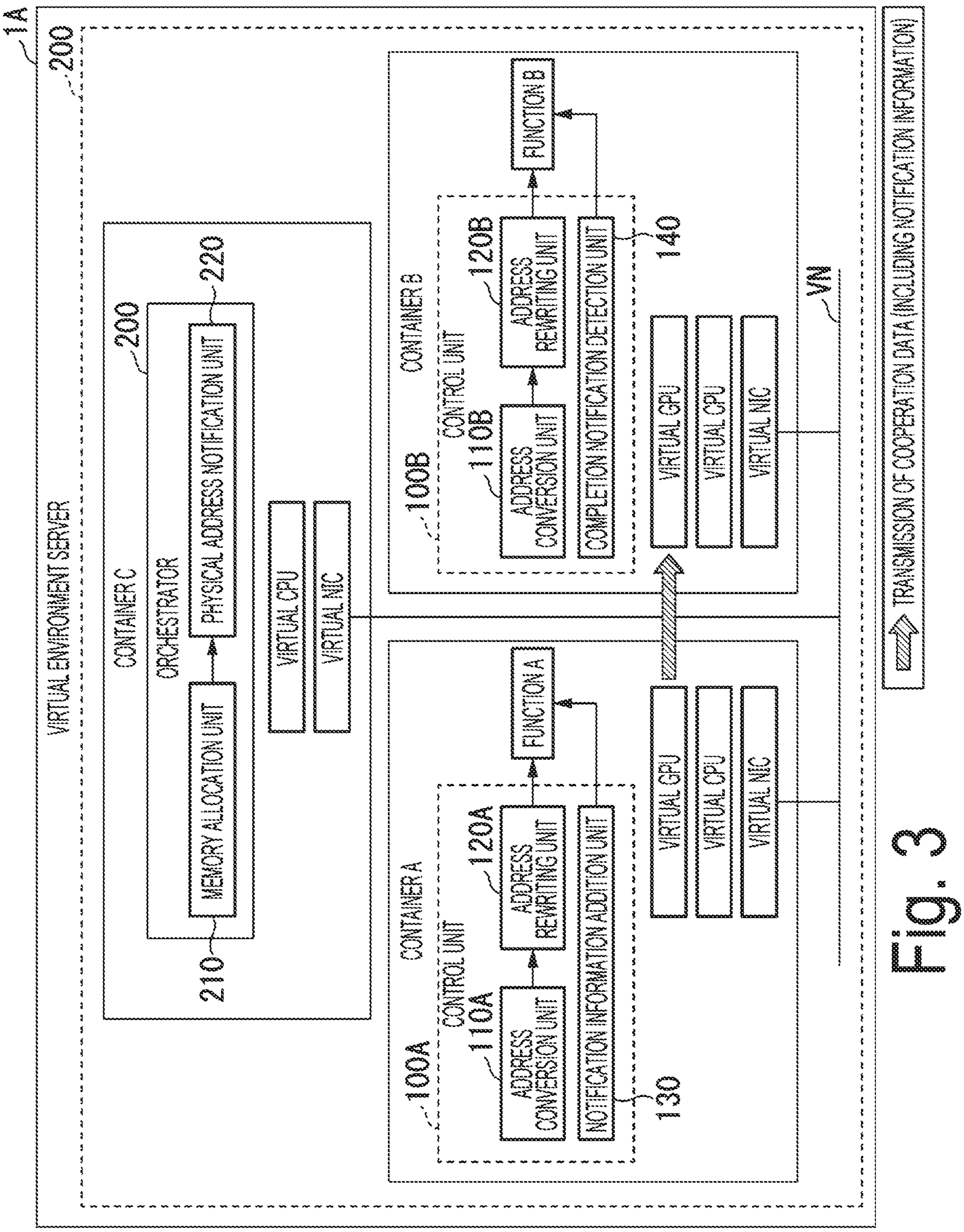
FIG. 3 illustrates a functional configuration example of a virtual environment server according to an embodiment.

FIG. 3 illustrates a functional configuration example of the virtual environment server 1A. Here, a functional configuration necessary in a case where the function A passes data to the function B will be described. In FIG. 3, the operating system 10A and the container engine 20A are omitted for convenience of space. First, a functional configuration of the orchestrator 200 that operates in the container C will be described. The orchestrator 200 includes, for example, a memory allocation unit 210 and a physical address notification unit 220.

The memory allocation unit 210 secures a memory area used for data cooperation between the function A and the function B in response to a memory allocation request from the container A. More specifically, the memory allocation unit 210 secures a transfer source memory area for holding transfer source data and a transfer destination memory area for holding transfer destination data. For example, the memory allocation unit 210 may secure a memory area having a requested size from among memory areas allocated to the container C in advance by the container engine 20A or may request the container engine 20A to secure a memory area having a requested size. The memory allocation unit 210 notifies the physical address notification unit 220 of a virtual address of the secured memory area. In a case where the memory allocation unit 210 can acquire a physical address of the memory area when securing the memory area, the memory allocation unit 210 may notify the physical address notification unit 220 of the physical address of the memory area. Each memory area is not necessarily allocated as a continuous area, but it is preferable that each memory area be typically secured as a continuous area in order to avoid complicated processing.

The physical address notification unit 220 acquires the physical address of the memory area secured by the memory allocation unit 210 and notifies the containers A and B of the acquired physical address. More specifically, the physical address notification unit 220 notifies the container A of a physical address of the transfer source memory area and a physical address of the transfer destination memory area and notifies the container B of the physical address of the transfer destination memory area. For example, in a case where the virtual address is issued from the memory allocation unit 210, the physical address notification unit 220 may store a correspondence table between the virtual address and the physical address in advance and acquire a physical address on the basis of the virtual address issued from the memory allocation unit 210 and the correspondence table. In a case where the physical address is issued from the memory allocation unit 210, the physical address notification unit 220 may notify each container of the issued physical address as it is. The virtual address is a memory address that can be referred to when each container accesses the memory area and is a virtual memory address associated with the physical address of the memory area. The association between the physical address and the virtual address is managed by the container engine 20A.

Next, a functional configuration of the control unit 100A of the cooperation source container A will be described. The control unit 100A includes, for example, an address conversion unit 110A, an address rewriting unit 120A, and a notification information addition unit 130. In a case where the function A performs data cooperation with the function B, the address conversion unit 110A requests the orchestrator 200 to allocate a memory area having a size necessary for the data cooperation and converts a physical address returned from the orchestrator 200 into a virtual address in response to the request. The size necessary for the data cooperation is specifically a size of cooperation data to which notification information described later is added. The address conversion unit 110A notifies the address rewriting unit 120A of the converted virtual address.

For example, the address conversion unit 110A may store a correspondence table between the virtual address and the physical address in advance and acquire a virtual address on the basis of the physical address issued from the orchestrator 200 and the correspondence table. Further, for example, the address conversion unit 110A may notify the container engine 20A of the physical address issued from the orchestrator 200 and request the container engine 20A to convert the physical address into the virtual address.

The address rewriting unit 120A rewrites a memory address that is referred to when the function A performs data cooperation with the function B to the virtual address issued from the address conversion unit 110A. More specifically, the address rewriting unit 120A rewrites an address of a memory area set in advance to be referred to by the function A as the transfer source memory area to the virtual address issued from the address conversion unit 110A as an address of the transfer source memory area and also rewrites an address of a memory area set in advance to be referred to by the function A as the transfer destination memory area to the virtual address issued from the address conversion unit 110A as an address of the transfer destination memory area.

The notification information addition unit 130 adds the notification information to the cooperation data and writes the cooperation data to the transfer source memory area. Here, the notification information indicates that transfer of the cooperation data has been completed on the basis of the fact that the notification information has been written to the transfer destination memory area. The transfer source memory area serving as a writing destination is a memory area indicated by the virtual address that is rewritten by the address rewriting unit 120A so as to be referred to by the function A as the transfer destination memory area.

In general, data in a memory is transferred in order from a head address to an end address in which the data is recorded. Therefore, the cooperation source function A performs data transfer by adding the notification information to the end of the cooperation data and therefore can issue a notification of completion of the transfer of the cooperation data on the basis of completion of the transfer of the notification information.

Next, a functional configuration of the control unit 100B of the cooperation destination container B will be described. The control unit 100B includes, for example, an address conversion unit 110B, an address rewriting unit 120B, and a completion notification detection unit 140. In a case where the function A performs data cooperation with the function B, the address conversion unit 110B converts the physical address of the transfer destination memory area issued from the orchestrator 200 into a virtual address. The address conversion unit 110B notifies the address rewriting unit 120B of the converted virtual address.

For example, as in the address conversion unit 110A, the address conversion unit 110B may store a correspondence table between the virtual address and the physical address in advance and acquire a virtual address on the basis of the physical address issued from the orchestrator 200 and the correspondence table. Further, for example, the address conversion unit 110B may notify the container engine 20A of the physical address issued from the orchestrator 200 and request the container engine 20A to convert the physical address into the virtual address.

The address rewriting unit 120B rewrites a memory address that is referred to when the function B acquires, from the function A, cooperation data that the function B is to cooperate to the virtual address issued from the address conversion unit 110B. More specifically, the address rewriting unit 120B rewrites an address of a memory area set in advance to be referred to by the function B as the transfer destination memory area to the virtual address issued from the address conversion unit 110B as an address of the transfer destination memory area.

The completion notification detection unit 140 has a function of detecting completion of the data transfer from the transfer source memory area to the transfer destination memory area. More specifically, the completion notification detection unit 140 determines that the data transfer is completed by detecting that the notification information has been written to the transfer source memory area issued from the orchestrator 200. When detecting the completion of the data transfer, the completion notification detection unit 140 instructs the function B to execute processing by using the cooperation data of the transfer destination memory area.

Figure 4:
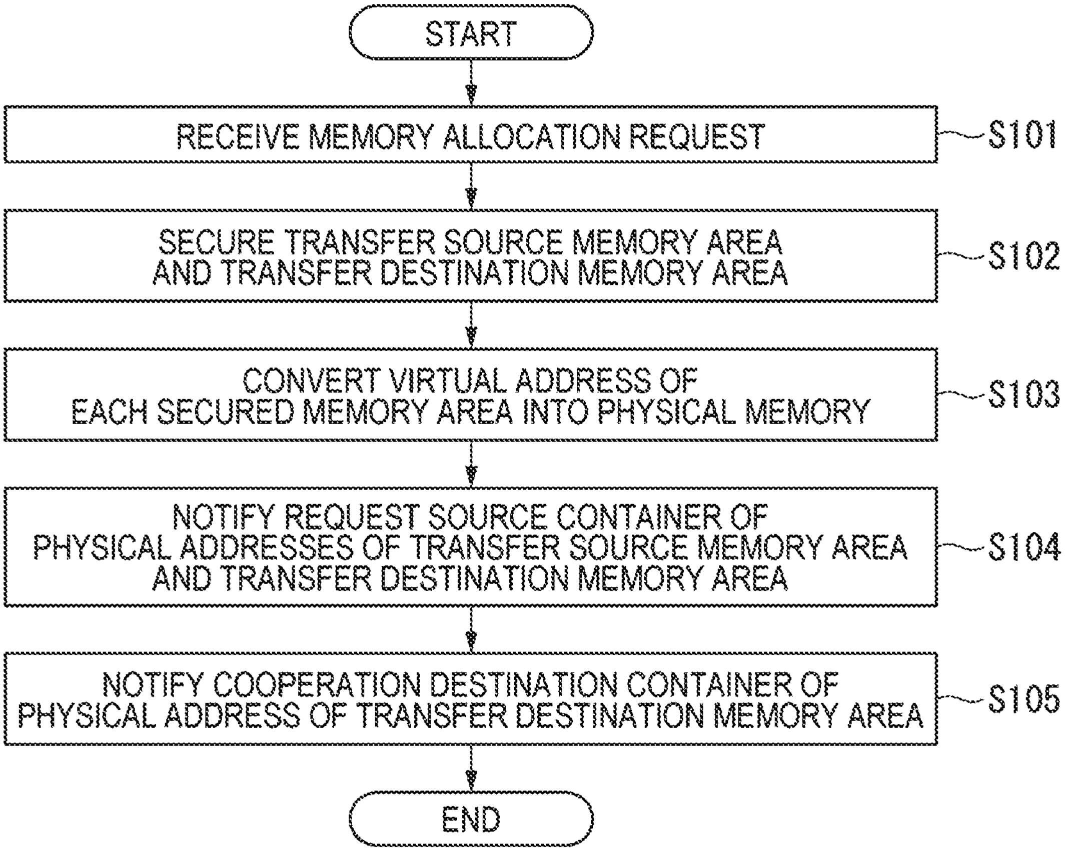
FIG. 4 is a flowchart showing an example of a flow of processing executed by an orchestrator regarding data cooperation between functions.

FIG. 4 is a flowchart showing an example of a flow of processing executed by the orchestrator 200 regarding data cooperation between the function A and the function B. First, the memory allocation unit 210 receives a "memory allocation request" that requests allocation of memory areas (transfer source memory area and transfer destination memory area) necessary for cooperation of cooperation data from the cooperation source container A (step S101). In response to the memory allocation request, the memory allocation unit 210 secures the transfer source memory area and the transfer destination memory area (step S102) and notifies the physical address notification unit 220 of a virtual address of each secured memory area.

Then, the physical address notification unit 220 converts the virtual addresses issued from the memory allocation unit 210 into physical addresses (step S103). The physical address notification unit 220 notifies the container A serving as a request source of the memory allocation request of the physical addresses of the transfer source memory area and the transfer destination memory area (step S104) and notifies the container B serving as a cooperation destination of the cooperation data of the physical address of the transfer destination memory area (step S105).

Figure 5:
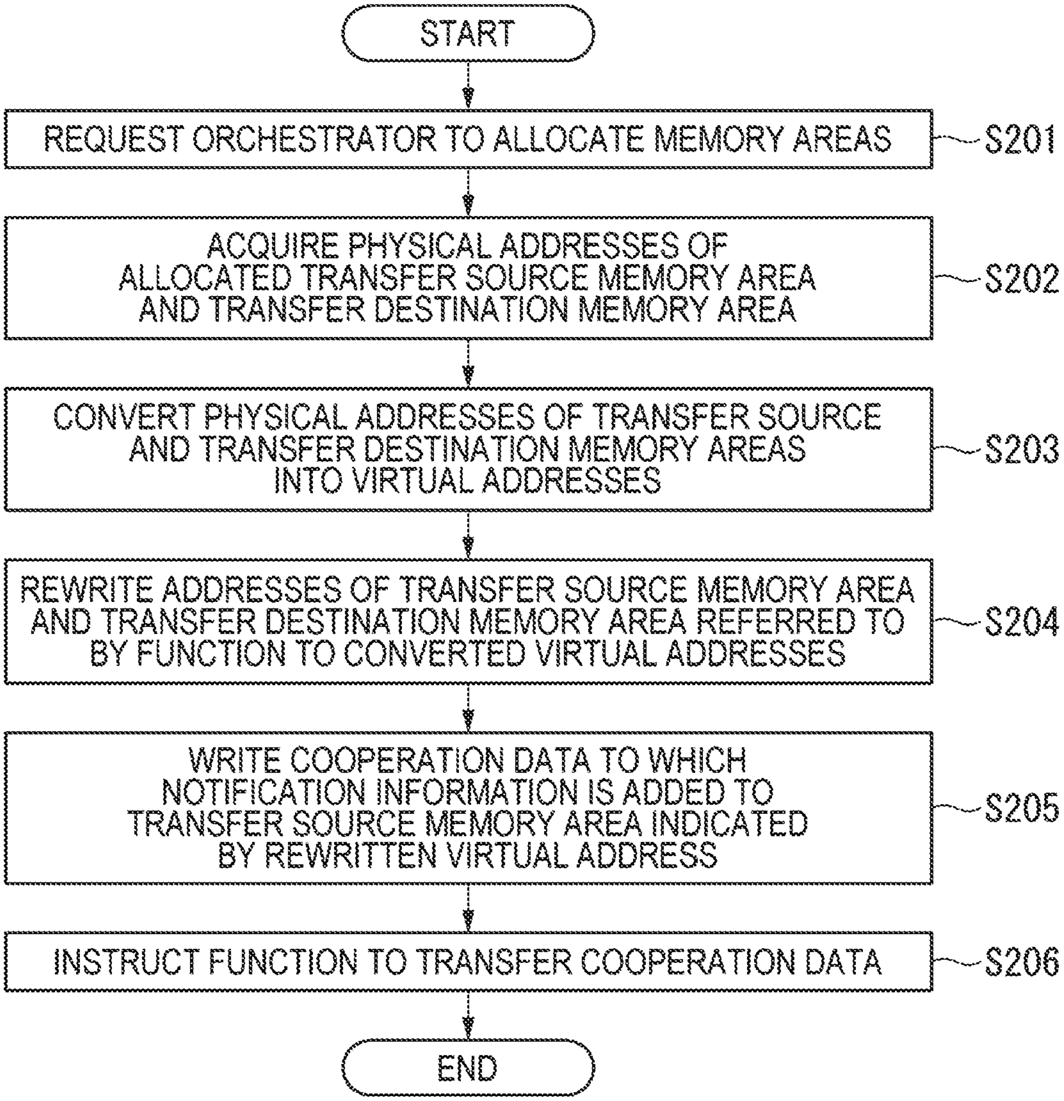
FIG. 5 is a flowchart showing an example of a flow of processing executed by a control unit of a cooperation source container regarding data cooperation between functions.

FIG. 5 is a flowchart showing an example of a flow of processing executed by the control unit 100A of the cooperation source container A regarding data cooperation between the function A and the function B. Here, a case where the function A performs data cooperation with the function B is assumed as a situation in which the processing flow of FIG. 5 is executed.

First, the address conversion unit 110A requests the orchestrator 200 to allocate memory areas having a size necessary for data cooperation (step S201: memory allocation request) and acquires physical addresses of the allocated transfer source memory area and transfer destination memory area from the orchestrator 200 as a response to the request (step S202).

Then, the address conversion unit 110A converts the physical addresses of the transfer source memory area and transfer destination memory area issued from the orchestrator 200 into virtual addresses (step S203). The address conversion unit 110A notifies the address rewriting unit 120A of each converted virtual address.

Then, the address rewriting unit 120A rewrites virtual addresses of the transfer source memory area and the transfer destination memory area which are referred to when the function A performs data cooperation with the function B to the virtual addresses issued from the address conversion unit 110A (step S204). When the rewriting of the virtual addresses is completed, then, the notification information addition unit 130 writes cooperation data to which notification information is added to the transfer source memory area indicated by the rewritten virtual address (step S205). When the writing of the cooperation data to the transfer source memory area is completed, the notification information addition unit 130 instructs the function A to transfer the cooperation data stored in the transfer source memory area to the transfer destination memory area (step S206).

Figure 6:
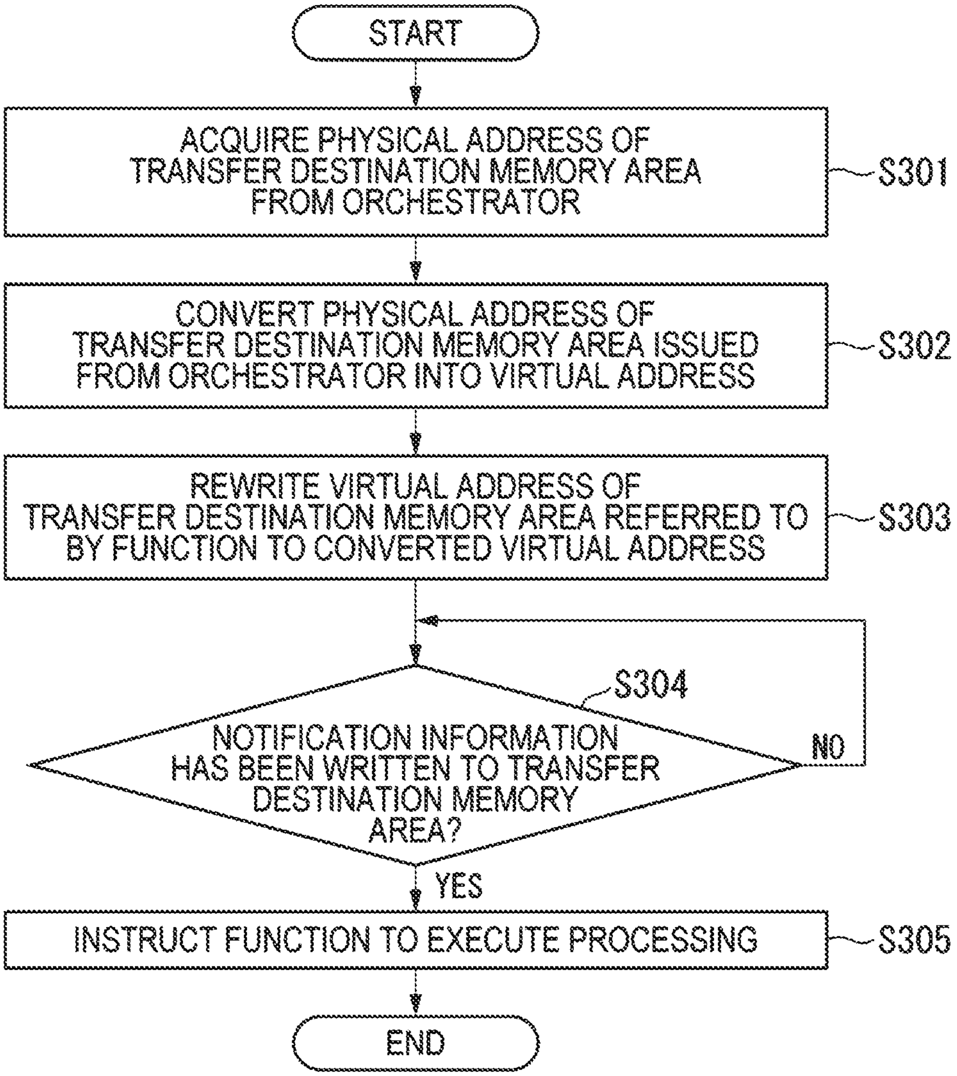
FIG. 6 is a flowchart showing an example of a flow of processing executed by a control unit of a cooperation destination container regarding data cooperation between functions.

FIG. 6 is a flowchart showing an example of a flow of processing executed by the control unit 100B of the cooperation destination container B regarding data cooperation between the function A and the function B. Here, a situation in which the orchestrator 200 notifies the container B of the physical address of the transfer destination memory area upon receipt of the memory allocation request from the container A is assumed as a situation in which the processing flow of FIG. 6 is executed.

First, the address conversion unit 110B acquires, from the orchestrator 200, the physical address of the transfer destination memory area allocated in response to the memory allocation request from the container A (step S301). The address conversion unit 110B converts the physical address of the transfer destination memory area issued from the orchestrator 200 into a virtual address (step S302) and notifies the address rewriting unit 120B of the converted virtual address.

Then, the address rewriting unit 120B rewrites a virtual address of the transfer destination memory area which is referred to when the function B acquires, from the function A, cooperation data that the function B is to cooperate to the virtual address issued from the address conversion unit 110B (step S303). When the rewriting of the virtual address is completed, then, the completion notification detection unit 140 determines whether or not the notification information has been written to the transfer source memory area issued from the orchestrator 200 (step S304).

Here, when it is determined that the notification information has not been written to the transfer destination memory area (step S304: NO), the completion notification detection unit 140 repeatedly performs step S304 until the notification information is written to the transfer destination memory area. Meanwhile, when it is determined that the notification information has been written to the transfer destination memory area (step S304: YES), the completion notification detection unit 140 instructs the function B to execute processing by using the cooperation data that the function A cooperates (step S305).

In the above description, a case where the function A of the container A cooperates cooperation data with the function B of the container B has been mainly described. However, this does not mean that each container functions as either a cooperation source or a cooperation destination. Each container may have both the functions of the control units 100A and 100B so as to function as either a cooperation source or cooperation destination of cooperation data. For example, each container may generate a control unit including an address conversion unit 110 having both the functions of the address conversion units 110A and 110B, an address rewriting unit 120 having both the functions of the address rewriting units 120A and 120B, the notification information addition unit 130, and the completion notification detection unit 140.

The virtual environment server 1 of the embodiment described above is configured such that: in a case where data cooperation between functions occurs, the orchestrator 200 secures a memory area necessary for the data cooperation and notifies cooperation source and cooperation destination containers of a physical address of the memory area; and control units of respective cooperation source and cooperation destination containers convert the physical address issued from the orchestrator 200 into a virtual address accessible by each container and rewrite a virtual address of the memory area which is referred to by a function as a transfer source memory area or transfer destination memory area to the converted virtual address. With such a configuration, the virtual environment server 1 according to the embodiment can more efficiently perform data cooperation between functions.

First Application Example

Figure 7:
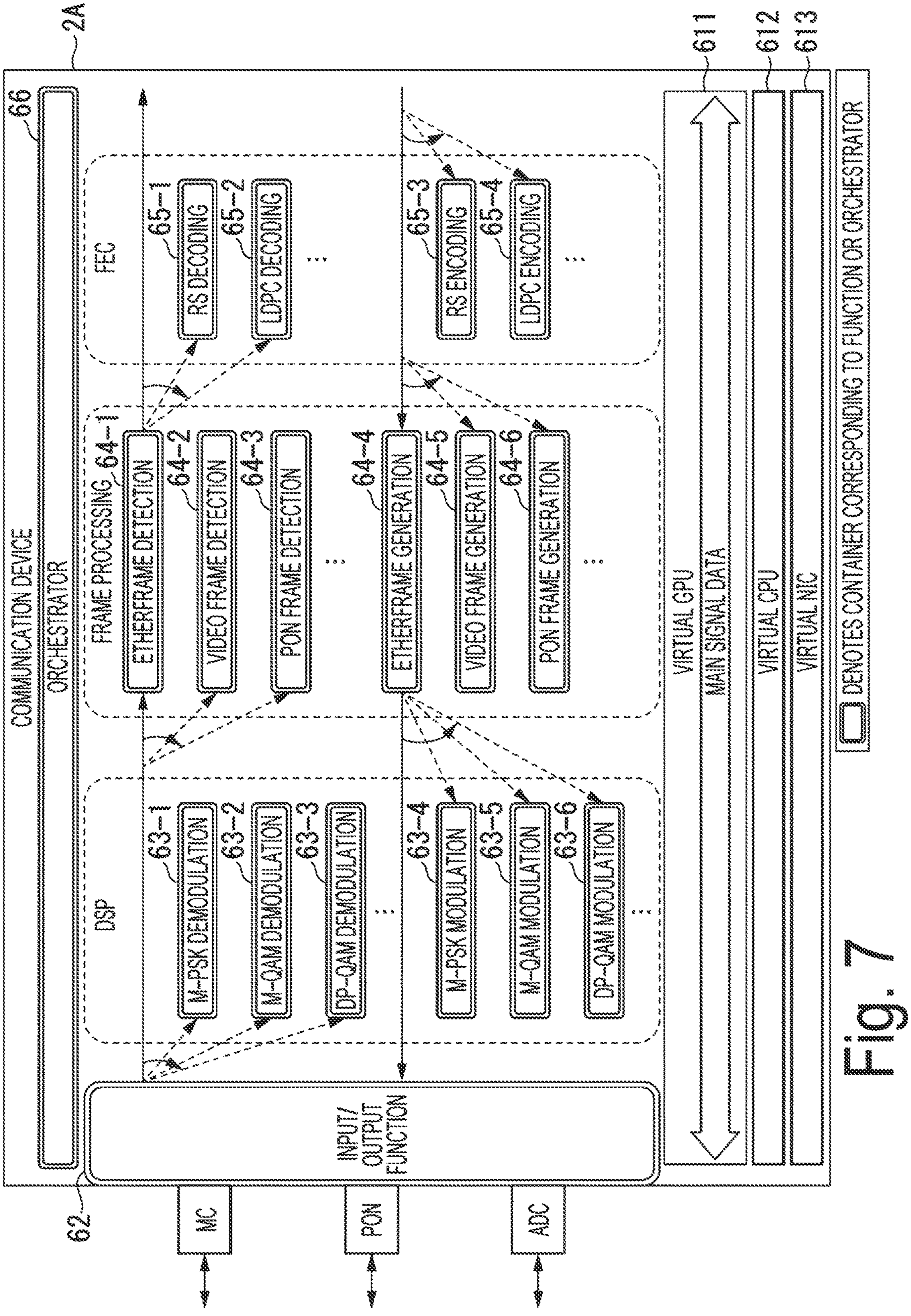
FIG. 7 is a schematic diagram illustrating a first application example of a virtual environment server according to an embodiment.

FIG. 7 is a schematic diagram illustrating a first application example of the virtual environment server 1 according to the embodiment. FIG. 7 illustrates an example where the virtual environment server 1 is applied to a communication device. For example, a communication device 2A in FIG. 7 is configured to achieve input/output processing of a communication signal, digital signal processing (DSP), frame processing, and error correction processing (forward error correction (FEC)) by data cooperation between containers provided for each function.

In FIG. 7, hardware resources are omitted for convenience of space, but a virtual GPU 611, a virtual CPU 612, and a virtual NIC 613 are configured by using hardware resources (not illustrated). In FIG. 7, the virtual GPU 611, the virtual CPU 612, and the virtual NIC 613 are images of the entire virtual hardware resources allocated to each container. As described above, in practice, dedicated resources are allocated to each container by using those virtual hardware resources.

Specifically, the communication device 2A generates a container 62 as a signal input/output function with a media converter (MC), a passive optical network (PON), or an analog digital converter (ADC). The communication device 2A also generates containers 63-1 to 63-6 as a function of achieving digital signal processing of communication, generates containers 64-1 to 64-6 as a function of achieving frame processing, and generates containers 65-1 to 65-4 as a function of achieving error correction processing. The communication device 2A further generates a container 66 as a container for the orchestrator 200 that achieves data cooperation between the containers.

For example, the containers 63-1 to 63-6 perform modulation and demodulation by M-phase shift keying (M-PSK), quadrature amplitude modulation (M-QAM), and dual polarization quadrature amplitude modulation (DP-QAM). The containers 64-1 to 64-6 detect and generate ethernet frames, video frames, and PON frames. The containers 65-1 to 65-4 encode and decode error correction codes by using a Reed-Solomon (RS) code and a low-density parity-check (LDPC) code.

In this case, the orchestrator 200 allocates different memory areas for respective functions and, in response to a function change request, switches a transfer destination memory area of cooperation data to a memory area corresponding to the changed function and notifies the control unit 100A of the memory area. With such a configuration, the communication device 2A of the application example can containerize a function of a physical layer in communication by software and can achieve cooperation of data (main signal data) between the functions by direct data transfer on the GPU. Further, with such a configuration, the communication device 2A of the application example can achieve high-speed and large-capacity data cooperation between the functions and can dynamically reflect a requested function change.

For example, in a case where a change of a communication modulation method to M-QAM is requested in a situation in which M-PSK is set as the modulation method, the orchestrator 200 instructs the control unit 100A of the container 62 (input/output function) to change a transfer destination memory area from a transfer destination memory area for the container 63-1 (M-PSK demodulation) to a transfer destination memory area for the container 63-2 (M-QAM demodulation), thereby dynamically switching the communication by M-PSK to communication by M-QAM.

Second Application Example

Figure 8:
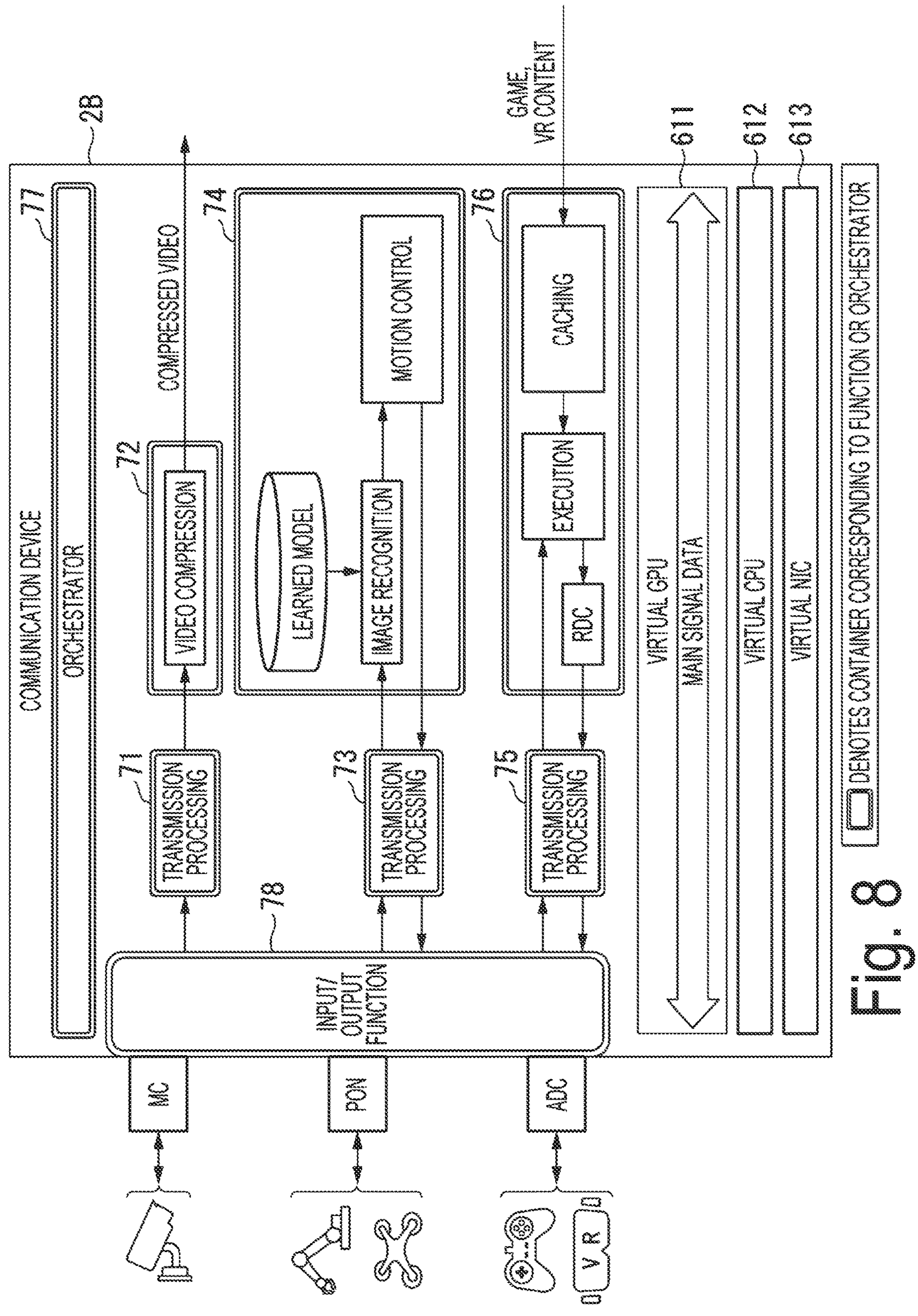
FIG. 8 is a schematic diagram illustrating a second application example of a virtual environment server according to an embodiment.

FIG. 8 is a schematic diagram illustrating a second application example of the virtual environment server 1 according to the embodiment. FIG. 8 illustrates an example where the virtual environment server 1 is applied to a communication device. For example, a communication device 2B in FIG. 8 containerizes a server application that provides different services depending on a communication interface and achieves data cooperation between the server application and another function by data transfer between containers.

In FIG. 8, as in the case of FIG. 7, the virtual GPU 611, the virtual CPU 612, and the virtual NIC 613 are configured by using hardware resources (not illustrated). In FIG. 8, as in the case of FIG. 7, the virtual GPU 611, the virtual CPU 612, and the virtual NIC 613 are images of the entire virtual hardware resources allocated to each container. As described above, in practice, dedicated resources are allocated to each container by using those virtual hardware resources.

Specifically, the communication device 2B generates a container 71 that performs transmission processing (e.g. modulation/demodulation processing or frame processing) of video information received from a camera device D1 via the MC and a container 72 as a server application that compresses the video information and provides the compressed video information for another device. The communication device 2B also generates a container 73 that performs transmission processing of image information received from a control target device D2 via the PON and a container 74 as a server application that generates control information for performing motion control of the control target device D2 on the basis of the image information. The communication device 2B further generates a container 75 that performs transmission processing of operation information of content such as a game or a video received via the ADC from a terminal device D3 that provides the content for a user and a container 76 as a server application that generates control information of the content on the basis of the operation information. As in the case of the communication device 2A, the communication device 2B generates a container 77 as a signal input/output function with the MC, the PON, and the ADC and also generates a container 78 as a container for the orchestrator 200 that achieves data cooperation between the containers.

For example, the container 74 performs image recognition processing on the basis of image information acquired from the control target device D2 and a learned model obtained by machine learning, generates control information for causing the control target device D2 to perform operation in accordance with the image recognition result, and transmits the control information to the control target device D2. For example, the container 76 generates control information of the content by performing caching processing (e.g. purchase of products, subscription, and suspension of subscription) regarding the content, execution processing of the content, and remote desktop service (RDS) on the basis of operation information acquired from the terminal device D3 and transmits the generated control information to the terminal device D3.

In this case, the orchestrator 200 manages communication of each server application as data cooperation between a container of each server application and a container of transmission processing for each server application. With such a configuration, the communication device 2B of the application example can achieve communication processing of data (main signal data) of each server application by direct data transfer on the GPU and can simultaneously operate a plurality of server applications in parallel on the GPU.

The virtual environment server 1 according to the embodiment can be applied not only to the communication device 2A according to a first modification example and the communication device 2B according to a second modification example but also to any device as long as the virtual environment server 1 is a device that executes processing that can be processed by an accelerator such as a GPU.

All or part of the virtual environment server 1A may be achieved with the use of hardware such as an application specific integrated circuit (ASIC), a programmable logic device (PLD), or an FPGA. The program may be recorded on a computer-readable recording medium. The computer-readable recording medium is, for example, a portable medium such as a flexible disk, a magneto-optical disc, a ROM, or a CD-ROM or a storage device such as a hard disk built in a computer system. The program may be transmitted via an electrical communication line.

Although the embodiments of the present invention have been described in detail with reference to the drawings, specific configurations are not limited to the embodiments and include any designs and the like within the scope of the invention.

INDUSTRIAL APPLICABILITY

The present invention is applicable to a system that achieves a function by using an accelerator.

REFERENCE SIGNS LIST

1, 1A, 1B Virtual environment server
2A, 2B Communication device
10A, 10B Operating system
20A Container engine
20B Hypervisor
21A, 21B Virtualized environment
100A, 100B Control unit
110, 110A, 110B Address conversion unit
120, 120A, 120B, 120B Address rewriting unit
130 Notification information addition unit
140 Completion notification detection unit
200 Orchestrator
210 Memory allocation unit
220 Physical address notification unit
611 Virtual GPU
612 Virtual CPU
613 Virtual NIC
62, 63-1 to 63-6, 64-1 to 64-6, 65-1 to 65-4, 66 Container
71, 72, 73, 74, 75, 76 Container
D1 Camera device
D2 Control target device
D3 Terminal device

The invention claimed is:

1. An information processing device including a function achieved by software executed in a virtual environment to which virtual hardware resources including an accelerator are allocated and an orchestrator, wherein:
- the orchestrator allocates a transfer source memory area and a transfer destination memory area for cooperation target data between functions; and
- the function includes a controller configured to convert a physical address of the transfer source memory area or transfer destination memory area allocated by the orchestrator into a virtual address, and rewrite an address of the transfer source memory area or the transfer destination memory area which is referred to when a function of an own virtual environment performs data cooperation with a function of another virtual environment to the virtual address.

2. The information processing device according to claim 1, wherein
- the controller is configured to rewrite the address of the transfer destination memory area which is referred to when the function of the own virtual environment accepts the data cooperation from the function of the another virtual environment to the address of the transfer destination memory area allocated by the orchestrator.

3. The information processing device according to claim 1, wherein
- in a case where the function of the own virtual environment performs the data cooperation with the function of the another virtual environment, the controller is configured to add notification information indicating completion of data transfer to the cooperation target data and writes the cooperation target data to the transfer source memory area having the rewritten address.

4. The information processing device according to claim 3, wherein
- the cooperation target data to which the notification information is added, the cooperation target data being stored in the transfer source memory area having the rewritten address, is transferred to the transfer destination memory area having the rewritten address by the function of the own virtual environment.

5. The information processing device according to claim 3, wherein
- in a case where the function of the own virtual environment accepts the data cooperation from the function of the another virtual environment, the controller is configured to detect that the data transfer has been completed on the basis of the fact that the notification information has been written to the transfer destination memory area having the rewritten address.

6. The information processing device according to claim 5, wherein the cooperation target data transferred to the transfer destination memory area having the rewritten address is referred to by the function of the own virtual environment after the completion of the data transfer is detected.

7. The information processing device according to claim 1, wherein the orchestrator is configured to allocate different memory areas for respective functions and, in response to a function change request, switch the transfer destination memory area of cooperation data to a memory area corresponding to a changed function and notifies the controller of the switched memory area.

8. An information processing method, wherein an information processing device including a function achieved by software executed in a virtual environment to which virtual hardware resources including an accelerator are allocated and an orchestrator causes the orchestrator to allocate a transfer source memory area and a transfer destination memory area for cooperation target data between the functions, and causes a controller of the function to convert a physical address of the transfer source memory area or transfer destination memory area allocated by the orchestrator into a virtual address, and rewrite an address of the transfer source memory area or the transfer destination memory area which is referred to when a function of an own virtual environment performs data cooperation with a function of another virtual environment to the virtual address.

* * * * *